United States Patent
Chen et al.

(10) Patent No.: US 12,439,438 B2
(45) Date of Patent: Oct. 7, 2025

(54) RESOURCE CONFIGURATION METHOD AND APPARATUS

(71) Applicant: Huawei Technologies Co., Ltd., Shenzhen (CN)

(72) Inventors: Lei Chen, Beijing (CN); Bingzhao Li, Beijing (CN); Zhenzhen Cao, Beijing (CN); Li Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 729 days.

(21) Appl. No.: 17/171,514

(22) Filed: Feb. 9, 2021

(65) Prior Publication Data
US 2021/0168810 A1 Jun. 3, 2021

Related U.S. Application Data

(63) Continuation of application No. PCT/CN2019/099816, filed on Aug. 8, 2019.

(30) Foreign Application Priority Data

Aug. 10, 2018 (CN) .......................... 201810912067.0

(51) Int. Cl.
*H04W 72/00* (2023.01)
*H04W 72/0453* (2023.01)
(Continued)

(52) U.S. Cl.
CPC ....... *H04W 72/53* (2023.01); *H04W 72/0453* (2013.01); *H04W 72/1263* (2013.01); *H04W 72/23* (2023.01); *H04W 76/27* (2018.02)

(58) Field of Classification Search
None
See application file for complete search history.

(56) References Cited

U.S. PATENT DOCUMENTS

2015/0319744 A1* 11/2015 Jung ...................... H04W 72/20
370/328
2018/0192383 A1 7/2018 Nam et al.
(Continued)

FOREIGN PATENT DOCUMENTS

CN 108012329 A 5/2018
EP 19848160 A1 * 8/2019 ............ H04W 72/04
(Continued)

OTHER PUBLICATIONS

NTT Docomo et al., "Bandwidth configuration for basic BWP operation", 3GPP TSG-RAN WG2 #102 R2-1807390, May 21-25, 2018, 3 pages.
MediaTek Inc., "Remaining details on SS block indication for rate matching and transmissions within wideband CC", 3GPP TSG RAN WG1 Meeting NR#3 R1-1716203, Nagoya, Japan, Sep. 18-21, 2017, 4 pages.
(Continued)

*Primary Examiner* — Gerald A Smarth
(74) *Attorney, Agent, or Firm* — Slater Matsil, LLP (57) ABSTRACT

This application provides a communication method, an apparatus, and a communications system, and relates to the field of communications technologies. A terminal device receives system information broadcast by a network device, and determines a bandwidth of an initial BWP based on the system information. The system information includes first indication information. The first indication information indicates that the bandwidth of the initial BWP used for the terminal device is a first bandwidth or a second bandwidth. The first bandwidth is indicated by using a first bandwidth parameter carried in the system information. The second bandwidth is a bandwidth of a CORESET 0. The CORESET 0 is used to schedule the system information.

9 Claims, 4 Drawing Sheets

(51) Int. Cl.
*H04W 72/1263* (2023.01)
*H04W 72/23* (2023.01)
*H04W 72/53* (2023.01)
*H04W 76/27* (2018.01)

(56) References Cited

U.S. PATENT DOCUMENTS

| | | | | |
|---|---|---|---|---|
| 2018/0220288 A1* | 8/2018 | Agiwal | ............... | H04W 4/30 |
| 2019/0045571 A1* | 2/2019 | Wu | ............... | H04W 76/15 |
| 2019/0082480 A1* | 3/2019 | Wu | ............... | H04W 76/30 |
| 2019/0356444 A1* | 11/2019 | Noh | ............... | H04L 5/0023 |
| 2019/0373577 A1* | 12/2019 | Agiwal | ............... | H04W 24/08 |
| 2020/0045709 A1* | 2/2020 | Seo | ............... | H04W 72/53 |
| 2021/0282122 A1* | 9/2021 | Takahashi | ............ | H04W 80/02 |

FOREIGN PATENT DOCUMENTS

| | | | | |
|---|---|---|---|---|
| EP | 3668128 A1 * | 6/2020 | ............ | H04L 67/12 |
| EP | 3820216 A1 | 5/2021 | | |
| EP | 3849255 A1 | 7/2021 | | |
| WO | 2020063679 A1 | 4/2020 | | |

OTHER PUBLICATIONS

3GPP TS 36.331 V15.2.2 (Jun. 2018); 3rd Generation Partnership Project; Technical Specification Group Radio Access Network; Evolved Universal Terrestrial Radio Access (E-UTRA); Radio Resource Control (RRC); Protocol specification (Release 15); 791 pages.
MediaTek Inc., "Discussion on Multiple SS Block Transmissions in Wideband CC", 3GPP TSG RAN WG1 Meeting #90 R1-1713682, Prague, P.R. Czechia, Aug. 21-25, 2017, 3 pages.
3GPP TS 38.213 V15.2.0: "3rd Generation Partnership Project; Technical Specification Group Radio Access Network; NR; Physical layer procedures for control(Release 15)", Jun. 2018, 99 pages.
3GPP TS 38.331 V15.2.1 (Jun. 2018); 3rd Generation Partnership Project; Technical Specification Group Radio Access Network; NR;Radio Resource Control (RRC) protocol specification(Release 15); 303 pages.
CMCC, "Discussion on the immediate cell reselection issue", 3GPP TSG-RAN WG2 Meeting #AH-1807 R2-1810760, Montreal, Canada, Jul. 2-6, 2018, 3 pages.

* cited by examiner

RESOURCE CONFIGURATION METHOD AND APPARATUS

CROSS-REFERENCE TO RELATED APPLICATIONS

This application is a continuation of International Application No. PCT/CN2019/099816, filed on Aug. 8, 2019, which claims priority to Chinese Patent Application No. 201810912067.0, filed on Aug. 10, 2018. The disclosures of the aforementioned applications are hereby incorporated by reference in their entireties.

TECHNICAL FIELD

This application relates to the field of communications technologies, and in particular, to a communication method, an apparatus, and a communications system.

BACKGROUND

A system bandwidth in a new radio access technology (NR) is relatively large, and is at least 100 MHz. Due to different capabilities of terminal devices, maximum bandwidths supported by the terminal devices are different. Some terminal devices may support only 80 MHz, 40 MHz, 20 MHz, or even a smaller bandwidth. Therefore, usually, a concept of bandwidth part (BWP) is introduced into NR to adapt to a requirement for a maximum bandwidth supported by a terminal device.

Specifically, currently, the BWP is configured for the terminal device, to adapt to the maximum bandwidth that can be supported by the terminal device. In addition, to flexibly schedule the terminal device, a plurality of BWPs with different bandwidths may be configured for the terminal device.

In the conventional technology, a base station broadcasts a synchronization signal block (SSB) to facilitate camping of the terminal device. The SSB carries a primary synchronization signal (PSS), a secondary synchronization signal (SSS), and a physical broadcast channel (PBCH). The PBCH carries a master information block (MIB). The MIB includes configuration information (such as a bandwidth and a frequency domain position of a control resource set (CORESET) 0) of the CORESET 0, and configuration information (such as time domain configuration information of a physical downlink control channel (PDCCH)) of the PDCCH of a system information block type 1 (SIB 1). After receiving the MIB, the terminal device determines that a bandwidth of an initial BWP is a bandwidth of the CORESET 0, then receives scheduling information of the SIB 1 on the initial BWP, and receives the SIB 1 on the initial BWP based on the scheduling information of the SIB 1.

To reduce power consumption of the terminal device, usually, the bandwidth of the CORESET 0 configured in the MIB is relatively small. However, in the conventional technology, to enable the terminal device to meet a service requirement, a bandwidth parameter is carried in the SIB 1, and the bandwidth parameter is used to indicate a reset bandwidth of the initial BWP. After receiving the SIB 1, the terminal device adjusts a bandwidth of the initial BWP based on the bandwidth parameter, so that the terminal device works on the initial BWP of the reset bandwidth. This manner of adjusting the bandwidth of the initial BWP has relatively poor flexibility, and performance of the terminal device is possible to be reduced. For example, usually, the reset bandwidth of the initial BWP is greater than the bandwidth of the CORESET 0. Therefore, after the terminal device works on the initial BWP of the reset bandwidth, for a terminal device in an idle state, power consumption of the terminal device is possible to be increased.

SUMMARY

Embodiments of this application provide a communication method, an apparatus, and a communications system, to help improve flexibility of adjusting a bandwidth of an initial BWP by a terminal device, thereby improving performance of the terminal device.

According to a first aspect, an embodiment of this application provides a communication method, including the following.

A terminal device receives system information broadcast by a network device, and determines a bandwidth of an initial BWP based on the system information. The system information includes first indication information. The first indication information indicates that the bandwidth of the initial BWP used for the terminal device is a first bandwidth or a second bandwidth. The first bandwidth is indicated by using a first bandwidth parameter carried in the system information. The second bandwidth is a bandwidth of a CORESET 0. The CORESET 0 is used to schedule the system information.

In this embodiment of this application, the first indication information is added to the system information. Therefore, the network device may indicate, to the terminal device based on the first indication information, whether to adjust the bandwidth of the initial BWP based on the first bandwidth after the terminal device receives the system information. Compared with an adjustment manner in the conventional technology, this helps improve flexibility of determining the bandwidth of the initial BWP by the terminal device.

In a possible design, the first indication information indicates that the bandwidth of the initial BWP used for the terminal device is the second bandwidth. The terminal device determines, based on the system information, that the bandwidth of the initial BWP is the second bandwidth, where the terminal device is in an idle state or an inactive state. When the terminal device receives a system information on the initial BWP whose bandwidth is the second bandwidth, the foregoing technical solution helps the terminal device skip adjusting the bandwidth of the initial BWP when the terminal device is in the idle state or the inactive state, thereby reducing power consumption of the terminal device.

In a possible design, the terminal device determines, based on the system information, that the bandwidth of the initial BWP is the first bandwidth, where the terminal device is in a connected state. The foregoing technical solution helps meet a service requirement of the terminal device.

In a possible design, after determining, based on the system information, that the bandwidth of the initial BWP is the second bandwidth, the terminal device determines, based on the first bandwidth parameter, that the bandwidth of the initial BWP is the first bandwidth. The foregoing technical solution helps enable the bandwidth of the initial BWP to meet the service requirement when the terminal device enters the connected state from the idle state or the inactive state.

In a possible design, when sending a random access request to the network device, the terminal device determines, based on the first bandwidth parameter, that the bandwidth of the initial BWP is the first bandwidth. The foregoing technical solution helps simplify a manner in which the terminal device determines the bandwidth of the initial BWP.

In a possible design, the system information further includes a second bandwidth parameter. The second bandwidth parameter indicates a bandwidth of a downlink frequency domain resource used to carry a random access response. The bandwidth indicated by the second bandwidth parameter is greater than the second bandwidth. The foregoing technical solution helps the terminal device determine a moment for adjusting the bandwidth of the initial BWP.

In a possible design, when sending a random access complete message to the network device, the terminal device determines, based on the first bandwidth parameter, that the bandwidth of the initial BWP is the first bandwidth. The foregoing technical solution helps simplify a manner in which the terminal device determines the bandwidth of the initial BWP.

In a possible design, a system information further includes a second bandwidth parameter. The second bandwidth parameter indicates a bandwidth of a downlink frequency domain resource used to carry a random access response. The bandwidth indicated by the second bandwidth parameter is less than or equal to the second bandwidth. The foregoing technical solution helps the terminal device determine a moment for adjusting the bandwidth of the initial BWP.

In a possible design, a system information further includes second indication information, and the second indication information is used to indicate a first moment. The terminal device determines, based on the first bandwidth parameter, that starting from the first moment, the bandwidth of the initial BWP is the first bandwidth. The foregoing technical solution helps simplify a manner in which the terminal device determines a moment for adjusting the bandwidth of the initial BWP.

In a possible design, the first indication information indicates that the bandwidth of the initial BWP used for the terminal device is the first bandwidth. The terminal device determines, based on the system information, that the bandwidth of the initial BWP is the first bandwidth.

In a possible design, the first bandwidth is greater than the second bandwidth. The foregoing technical solution helps reduce power consumption of the terminal device.

According to a second aspect, an embodiment of this application provides a communication method, including the following.

The network device generates system information, and broadcasts the system information. The system information includes first indication information. The first indication information indicates that a bandwidth of an initial BWP used for a terminal device is a first bandwidth or a second bandwidth. The first bandwidth is indicated by using a first bandwidth parameter carried in the system information. The second bandwidth is a bandwidth of a CORESET 0. The CORESET 0 is used to schedule the system information.

In this embodiment of this application, the first indication information is added to the system information. Therefore, the network device may indicate, to the terminal device based on the first indication information, whether to adjust the bandwidth of the initial BWP based on the first bandwidth after the terminal device receives the system information. Compared with an adjustment manner in the conventional technology, this helps improve flexibility of determining the bandwidth of the initial BWP by the terminal device.

In a possible design, the system information further includes second indication information, and the second indication information is used to indicate a moment for adjusting the bandwidth of the initial BWP used for the terminal device. The foregoing technical solution helps simplify a manner in which the terminal device determines the moment for adjusting the bandwidth of the initial BWP.

In a possible design, the system information further includes a second bandwidth parameter, and the second bandwidth parameter indicates a bandwidth of a downlink frequency domain resource used to carry a random access response. The foregoing technical solution helps the terminal device determine a moment for adjusting the bandwidth of the initial BWP.

According to a third aspect, an embodiment of this application provides an apparatus. The apparatus includes a receiving module and a processing module. The receiving module is configured to receive system information broadcast by a network device. The system information includes first indication information. The first indication information indicates that a bandwidth of an initial bandwidth part BWP used for a terminal device is a first bandwidth or a second bandwidth. The processing module is configured to determine the bandwidth of the initial BWP based on the system information. The first bandwidth is indicated by using a first bandwidth parameter carried in the system information. The second bandwidth is a bandwidth of a control resource set CORESET 0. The CORESET 0 is used to schedule the system information.

In a possible design, the first indication information indicates that the bandwidth of the initial BWP used for the terminal device is the second bandwidth. The processing module is configured to determine, based on the system information, that the bandwidth of the initial BWP is the second bandwidth, where the terminal device is in an idle state or an inactive state.

In a possible design, the processing module is configured to determine, based on the system information, that the bandwidth of the initial BWP is the first bandwidth, where the terminal device is in a connected state.

In a possible design, the processing module is further configured to: after determining, based on the system information, that the bandwidth of the initial BWP is the second bandwidth, determine, based on a first bandwidth parameter, that the bandwidth of the initial BWP is the first bandwidth.

In a possible design, the apparatus further includes a sending module. The processing module is configured to: when the sending module sends a random access request to the network device, determine, based on the first bandwidth parameter, that the bandwidth of the initial BWP is the first bandwidth.

In a possible design, the system information further includes a second bandwidth parameter. The second bandwidth parameter indicates a bandwidth of a downlink frequency domain resource used to carry a random access response. The bandwidth indicated by the second bandwidth parameter is greater than the second bandwidth.

In a possible design, the apparatus further includes a sending module. The processing module is configured to: when the sending module sends a random access complete message to the network device, determine, based on the first bandwidth parameter, that the bandwidth of the initial BWP is the first bandwidth.

In a possible design, system information further includes a second bandwidth parameter. The second bandwidth parameter indicates a bandwidth of a downlink frequency domain resource used to carry a random access response.

The bandwidth indicated by the second bandwidth parameter is less than or equal to the second bandwidth.

In a possible design, system information further includes second indication information, and the second indication information is used to indicate a first moment. The processing module is configured to determine, based on the first bandwidth parameter, that starting from the first moment, the bandwidth of the initial BWP is the first bandwidth.

In a possible design, the first indication information indicates that the bandwidth of the initial BWP used for the terminal device is the first bandwidth. The processing module is configured to determine, based on the system information, that the bandwidth of the initial BWP is the first bandwidth.

In a possible design, the first bandwidth is greater than the second bandwidth.

It should be noted that in any one of the third aspect and the possible designs of the third aspect, the processing module corresponds to a processor in a hardware device, the receiving module corresponds to a receiver in a hardware module, and the sending module corresponds to a transmitter in the hardware module. The sending module and the receiving module may be integrated into one functional entity such as a transceiver, or may be two independent functional entities. This is not limited in this embodiment of this application.

According to a fourth aspect, an embodiment of this application further provides a terminal device, including a processor, a transceiver, and a memory. The memory is configured to store a program instruction, the transceiver is configured to receive and send information, and the processor is configured to execute the program instruction stored in the memory, to implement the technical solution according to any one of the first aspect or the possible designs provided in the first aspect of the embodiments of this application.

According to a fifth aspect, an embodiment of this application further provides a computer storage medium, configured to store a program of the technical solution according to any one of the first aspect or the possible designs provided in the first aspect.

According to a sixth aspect, an embodiment of this application provides a chip. The chip is coupled to a transceiver in a terminal device, and is configured to perform the technical solution according to any one of the first aspect or the possible designs provided in the first aspect of the embodiments of this application.

According to a seventh aspect, an embodiment of this application provides an apparatus, including a processing module and a sending module. The processing module is configured to generate system information. The system information includes first indication information. The first indication information indicates that a bandwidth of an initial BWP used for a terminal device is a first bandwidth or a second bandwidth. The sending module is configured to broadcast the system information. The first bandwidth is indicated by using a first bandwidth parameter carried in the system information. The second bandwidth is a bandwidth of a CORESET 0. The CORESET 0 is used to schedule the system information.

In a possible design, the system information further includes second indication information, and the second indication information is used to indicate a moment for adjusting the bandwidth of the initial BWP used for the terminal device.

In a possible design, the system information further includes a second bandwidth parameter, and the second bandwidth parameter indicates a bandwidth of a downlink frequency domain resource used to carry a random access response.

It should be noted that in any one of the third aspect and the possible designs of the third aspect, the processing module corresponds to the processor in the hardware device, and the sending module corresponds to the transmitter in the hardware module.

According to an eighth aspect, an embodiment of this application further provides a network device, including a processor, a transceiver, and a memory. The memory is configured to store a program instruction, the transceiver is configured to receive and send information, and the processor is configured to execute the program instruction stored in the memory, to implement the technical solution according to any one of the second aspect or the possible designs provided in the second aspect of the embodiments of this application.

According to a ninth aspect, an embodiment of this application further provides a computer storage medium, configured to store a program of the technical solution according to any one of the second aspect or the possible designs provided in the second aspect.

According to a tenth aspect, an embodiment of this application provides a chip. The chip is coupled to a transceiver in a network device, and is configured to perform the technical solution according to any one of the second aspect or the possible designs provided in the second aspect of the embodiments of this application.

It should be understood that "couple" in this embodiment of this application indicates direct combinations or indirect combinations of two parts. Such a combination may be fixed or mobile, and such a combination may allow communication of fluid, electricity, an electrical signal, or another type of signal between the two components.

According to an eleventh aspect, an embodiment of this application provides a communications system, including the terminal device according to any one of the third aspect or the possible designs provided in the third aspect of the embodiments of this application and the terminal device according to any one of the eighth aspect or the possible designs provided in the eighth aspect of the embodiments of this application.

In addition, for technical effects brought by any one of the possible designs of the third to the eleventh aspects, refer to the technical effects brought by different design manners in the first aspect. Details are not described herein again.

DETAILED DESCRIPTION OF ILLUSTRATIVE EMBODIMENTS

The following describes the embodiments of this application in detail with reference to the accompanying drawings of this specification.

The terms "system" and "network" may be used interchangeably in the embodiments of this application. The term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that the embodiments of this application may be used in, but not limited to, an NR system, and may further be used in communications systems such as a long term evolution (LTE) system, a long term evolution-advanced (LTE-A) system, and an enhanced long term evolution-advanced (eLTE) system. The embodiments of this application may also be used in related cellular systems such as a wireless fidelity (WiFi) system, a worldwide interoperability for microwave access (wimax) system, and a 3rd generation partnership project (3GPP) system.

Figure 1:
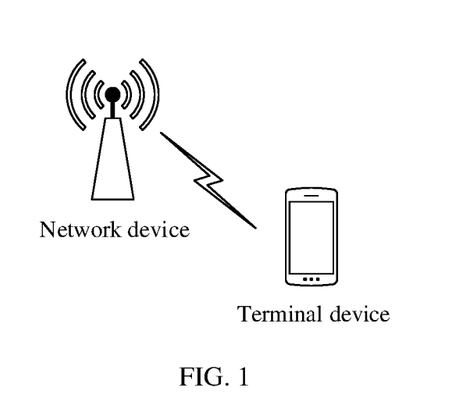
FIG. 1 is a schematic architectural diagram of a possible communications system to which embodiments of this application are applicable.

For example, FIG. 1 is a schematic architectural diagram of a possible communications system to which embodiments of this application are applicable. The communications system shown in FIG. 1 includes a network device and a terminal device. A quantity of network devices and a quantity of terminal devices in the communications system are not limited in the embodiments of this application. In addition to the network device and the terminal device, the communications system to which the embodiments of this application is applicable may further include other devices such as a core network device, a wireless relay device, and a wireless backhaul device. This is not limited in the embodiments of this application either. In addition, the network device in the embodiments of this application may integrate all functions into one independent physical device, or may distribute the functions on a plurality of independent physical devices. This is not limited in the embodiments of this application either. In addition, the terminal device in the embodiments of this application may be connected to the network device wirelessly. It should be further noted that the terminal device in the embodiments of this application may be at a fixed position, or may be mobile.

Figure 2:
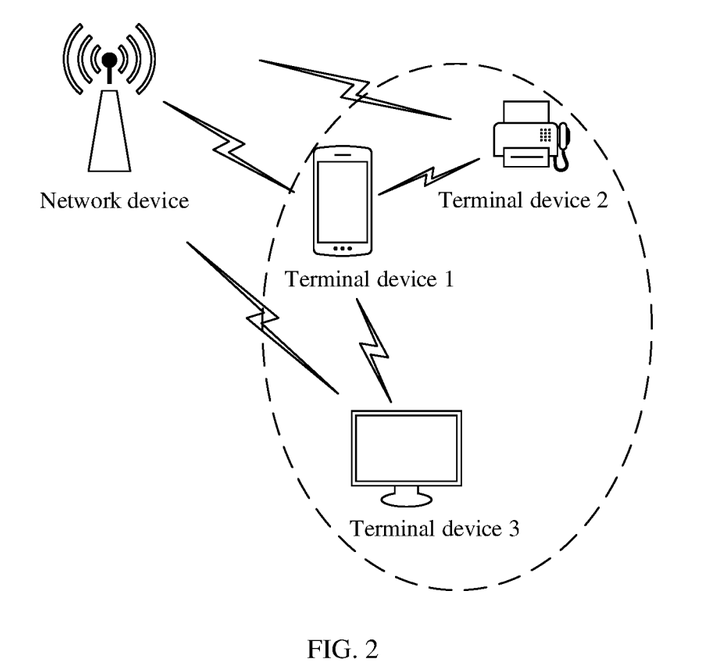
FIG. 2 is a schematic architectural diagram of another possible communications system to which embodiments of this application are applicable.

It should be understood that FIG. 1 is merely a schematic architectural diagram of the communications system. In the communications system shown in FIG. 1, the terminal device may send uplink data to the network device, and the network device may send downlink data to the terminal device. In addition, when the quantity of terminal devices included in the communications system shown in FIG. 1 is greater than or equal to 2, the terminal devices may further form a communications system. For example, when the quantity of terminal devices in the communications system shown in FIG. 1 is 3, an architecture of the communications system may be shown in FIG. 2. The communications system shown in FIG. 2 includes a network device, a terminal device 1, a terminal device 2, and a terminal device 3. The network device may send downlink data to the terminal device 1, the terminal device 2, and the terminal device 3. The terminal device 1 may send downlink data to the terminal device 2 and the terminal device 3. The embodiments of this application may also be used in a communications system including the terminal device 1, the terminal device 2, and the terminal device 3. In the communications system including the terminal device 1, the terminal device 2, and the terminal device 3, the terminal device 1 may be equivalent to the network device in the embodiments of this application, and the terminal device 2 and the terminal device 3 are equivalent to the terminal device in the embodiments of this application.

The network device in the embodiments of this application is an entity configured to transmit or receive a signal on an access network side, and may be configured to connect the terminal device to the communications system. Specifically, the network device may be a NodeB, an evolved NodeB (eNB), a base station in 5G, a base station in a future mobile communications system, an access node in a wireless fidelity (WiFi) system, or the like. A specific technology and a specific device form that are used by the network device are not limited.

The terminal device in the embodiments of this application is an entity configured to transmit or receive a signal on a user side, and may also be referred to as a terminal, user equipment (UE), a mobile station (MS), a mobile terminal (MT), or the like. Specifically, the terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. This is not limited.

It should be understood that the network device and the terminal device in the embodiments of this application may be deployed on the land, including an indoor device, an outdoor device, a handheld device, or a vehicle-mounted device; may be deployed on the water; or may be deployed on an airplane, a balloon, and a satellite in the air. Application scenarios of the network device and the terminal device are not limited.

It should be understood that in the embodiments of this application, communication between the network device and the terminal device and communication between terminal devices may be performed by using a licensed spectrum, or may be performed by using an unlicensed spectrum, or may be performed by using both a licensed spectrum and an unlicensed spectrum. This is not limited. Communication between a radio access network device and the terminal device and communication between the terminal devices may be performed by using a spectrum below 6 gigahertz (GHz), a spectrum above 6 GHz, or both a spectrum below 6 GHz and a spectrum above 6 GHz. A spectrum resource used between the network device and the terminal device is not limited in the embodiments of this application.

The following describes some terms in the embodiments of this application, to facilitate understanding by a person skilled in the art.

1. Frequency domain resource: A frequency domain resource in the embodiments of this application is a physical resource used for communication in frequency domain. For example, the frequency domain resource may be a BWP or a resource block.

Figure 3:
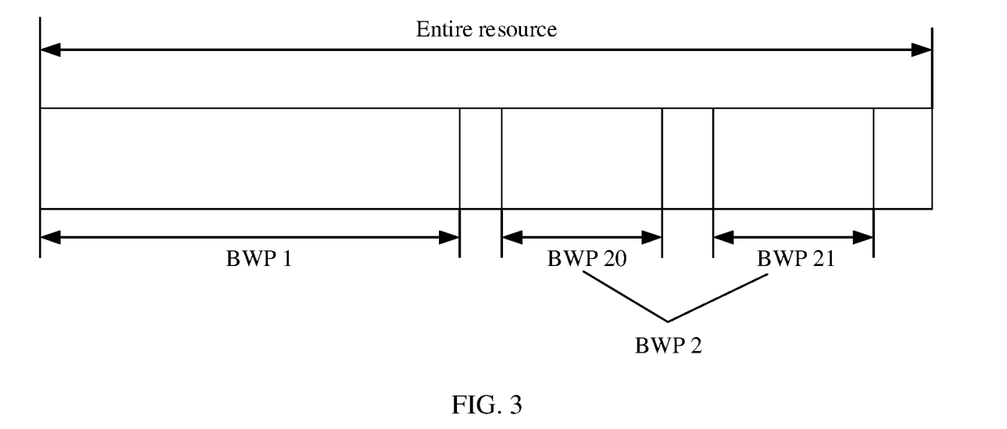
FIG. 3 is a schematic diagram of a BWP according to an embodiment of this application.

2. BWP: A BWP in the embodiments of this application is a segment of consecutive frequency domain resources, or non-consecutive frequency domain resources. A bandwidth of the segment of consecutive frequency domain resources or a bandwidth of the non-consecutive frequency domain resources is less than or equal to a maximum bandwidth supported by the terminal device in frequency domain, and may be used to transmit physical channel information or physical signal information. The physical channel information includes physical uplink and downlink control channel information and physical uplink and downlink shared channel information. For example, as shown in FIG. 3, a BWP 1 is a segment of consecutive frequency domain resources in an entire communications system bandwidth. A BWP 2 is non-consecutive frequency domain resources in the entire communications system bandwidth. The BWP 2 includes a BWP 20 and a BWP 21, and the BWP 20 and the BWP 21 are non-consecutive. It should be noted that BWPs of different terminal devices may overlap or may not overlap in frequency domain. This is not limited.

3. Initial BWP: An initial BWP in the embodiments of this application may also be referred to as an initial BWP. In the embodiments of this application, the initial BWP may be an initial downlink BWP (initial DL BWP for short), and may be used to carry a SIB 1 or the like.

4. Terminal device in an idle state: In the embodiments of this application, a terminal device in an idle state may also be referred to as idle UE. It should be noted that in the idle state, there is no connection between the terminal device and a network side. For example, the terminal device is in the idle state when the terminal device is just powered on.

5. Terminal device in an inactive state: In the embodiments of this application, a terminal device in an inactive state may also be referred to as inactive UE. It should be noted that in the inactive state, there is no connection between the terminal device and a network device on an access network side. However, for the terminal device, there is a corresponding connection between the network device on the access network side and a network device on a core network side.

6. Terminal device in a connected state: In the embodiments of this application, a terminal device in a connected state may also be referred to as active UE. It should be noted that, in the active (connected) state, the terminal device and a network device are connected. In addition, in the active state, data may be transmitted between the terminal device and the network device.

A terminal device determines a bandwidth of an initial BWP based on a bandwidth parameter configured by a network device. For example, after receiving a MIB on a PBCH, the terminal device determines that the bandwidth of the initial BWP is a bandwidth of a CORESET 0 included in the MIB. Then, the terminal device receives a SIB 1 on the initial BWP of the bandwidth of the CORESET 0. In the conventional technology, to meet a service requirement, the SIB 1 carries a reset parameter for the bandwidth of the initial BWP, and then the terminal device resets the bandwidth of the initial BWP based on the reset parameter. However, for the terminal device, after the terminal device receives the SIB 1, if the bandwidth of the initial BWP is reset based on the reset parameter, power consumption of the terminal device may increase. For example, when the terminal device is in an idle state, and a bandwidth of a reset initial BWP is greater than the bandwidth of the CORESET 0, in the foregoing adjustment manner based on the bandwidth of the initial BWP, the power consumption of the terminal device increases. Therefore, for the terminal device, flexibility of the manner in which the bandwidth of the initial BWP is adjusted based only on the bandwidth that is of the initial BWP and that is indicated by the bandwidth parameter is relatively poor. This may cause relatively poor performance of the terminal device.

Figure 4:
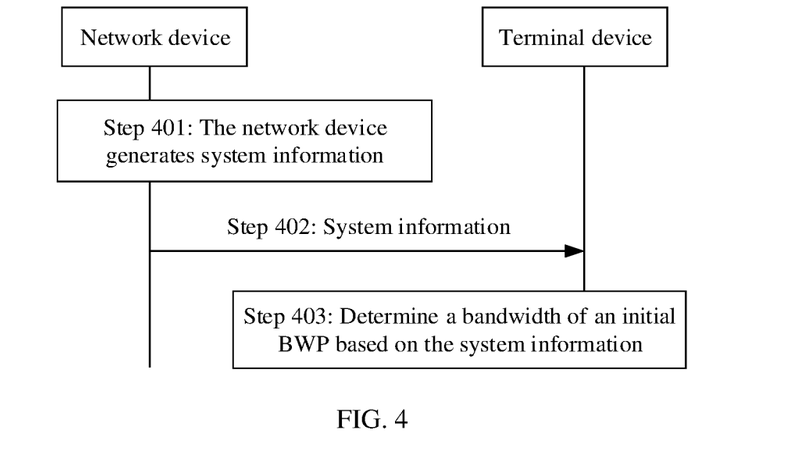
FIG. 4 is a schematic flowchart of a communication method according to an embodiment of this application.

To improve flexibility of indicating the bandwidth of the initial BWP, in the embodiments of this application, an indication indicating a bandwidth of the initial BWP that is to be used by the terminal device is added to system information, so that the terminal device can determine, based on the foregoing indication and with reference to the bandwidth parameter, whether to adjust the bandwidth of the initial BWP. The following describes the embodiments of this application in detail by using the communications system architecture shown in FIG. 1 as an example. Specifically, as shown in FIG. 4, a communication method in the embodiments of this application includes the following steps.

Step 401: A network device generates system information. The system information includes first indication information. The first indication information indicates that a bandwidth of an initial BWP used for a terminal device is a first bandwidth or a second bandwidth. The first bandwidth is indicated by using a first bandwidth parameter carried in the system information. The second bandwidth is a bandwidth of a CORESET 0. The CORESET 0 is used to schedule the system information. Specifically, the network device determines that the bandwidth of the initial BWP used for the terminal device is one of the first bandwidth and the second bandwidth, and notifies the terminal device based on the first indication information.

It should be noted that the network device may add the bandwidth of the CORESET 0 to a MIB and send the MIB to the terminal device, or may send the bandwidth of the CORESET 0 to the terminal device in another manner. This is not limited.

In this embodiment of this application, during specific implementation, the system information may be a SIB 1, or may be other system information or the like. This is not limited. In addition, it should be noted that the bandwidth that is of the initial BWP used for the terminal device and that is indicated by the first indication information is one of the first bandwidth and the second bandwidth. The initial BWP used for the terminal device is an initial BWP used to carry downlink data sent by the network device to the terminal device. It should be noted herein that, that the first indication information indicates one of the first bandwidth and the second bandwidth does not mean that the first indication information is used to indicate only the first bandwidth or the second bandwidth. Instead, in different scenarios, the network device determines, from the first bandwidth and the second bandwidth, a bandwidth used for the terminal device, and indicates the bandwidth by using the first indication information.

Specifically, in some embodiments, to reduce power consumption of the terminal device, the first indication information indicates that a bandwidth of an initial BWP used for a terminal device in an idle state/inactive state is a smaller one of the first bandwidth and the second bandwidth. For example, when the first bandwidth is greater than the second bandwidth, the first indication information indicates that the bandwidth of the initial BWP used for the terminal device in the idle state/inactive state is the second bandwidth. For another example, when the first bandwidth is less than or equal to the second bandwidth, the first indication information indicates that the bandwidth of the initial BWP used for the terminal device in the idle state/inactive state is the first bandwidth.

In some other embodiments, the first indication information may further indicate that the initial bandwidth used for the terminal device is the first bandwidth.

In this embodiment of this application, whether the bandwidth that is of the initial BWP used for the terminal device and that is indicated by the first indication information is the first bandwidth or the second bandwidth may be determined by the network device based on a preconfigured policy, or may be preconfigured. This is not limited.

Step 402: The network device broadcasts the system information. A frequency domain resource used to carry the system information is the initial BWP, and when the initial BWP is used to carry the system information, the bandwidth of the initial BWP is the second bandwidth.

Step 403: After receiving the system information, the terminal device determines the bandwidth of the initial BWP based on the system information. Specifically, the terminal device receives the system information on the initial BWP of the second bandwidth. It should be noted that the terminal device determines the bandwidth of the initial BWP based on the system information, to ensure better communication of the terminal device and correspondingly adjust a bandwidth of an initial BWP used in current communication. The bandwidth of the initial BWP used by the terminal device in current communication is the bandwidth of the initial BWP carrying the system information.

The following explains step 403 in detail with reference to different states of the terminal device.

For example, when the terminal device is in a connected state, regardless of whether the bandwidth that is of the initial BWP used for the terminal device and that is indicated by the first indication information is the first bandwidth or the second bandwidth, the terminal device determines, based on the system information, that the bandwidth of the initial BWP is the first bandwidth. Therefore, when the terminal device is in the connected state, if the terminal device works on an initial BWP of the second bandwidth when receiving the system information, and determines, based on the system information, that the bandwidth of the initial BWP is the first bandwidth, the terminal device adjusts the bandwidth of the initial BWP from the second bandwidth to the first bandwidth. Specifically, the terminal device adjusts a radio frequency of a transceiver from the second bandwidth to the first bandwidth.

For another example, when the terminal device is in an idle state or an inactive state, and the first indication information indicates that the bandwidth of the initial BWP used for the terminal device is the first bandwidth, the terminal device determines, based on the system information, that the bandwidth of the initial BWP is the first bandwidth. It should be noted that, when the terminal device determines, based on the system information, that the bandwidth of the initial BWP is the first bandwidth, if the terminal device works on an initial BWP of the second bandwidth when receiving the system information, to enable the terminal device to normally receive data, the terminal device adjusts a bandwidth of the initial BWP from the second bandwidth to the first bandwidth. Specifically, the terminal device adjusts a radio frequency of a transceiver from the second bandwidth to the first bandwidth.

For still another example, when the terminal device is in an idle state or an inactive state, and the first indication information indicates that the bandwidth of the initial BWP used for the terminal device is the second bandwidth, the terminal device determines, based on the system information, that the bandwidth of the initial BWP is the second bandwidth. In this case, because an operating bandwidth of a radio frequency of a transceiver of the terminal device is the second bandwidth, the radio frequency of the transceiver does not need to be adjusted.

However, when the terminal device is in the idle state or the inactive state, and the first indication information indicates that the bandwidth of the initial BWP used for the terminal device is the second bandwidth, after the terminal device determines, based on the system information, that the bandwidth of the initial BWP is the second bandwidth, further, if a state of the terminal device changes, the terminal device determines, based on the first bandwidth parameter, that the bandwidth of the initial BWP is the first bandwidth. That is, after determining, based on the first indication information, that the bandwidth of the initial BWP is the second bandwidth, the terminal device may further adjust the bandwidth of the initial BWP from the second bandwidth to the first bandwidth based on a state change of the terminal device or another possible factor or condition.

For example, after the terminal device determines, based on the system information, that the bandwidth of the initial BWP is the second bandwidth, when the terminal device enters the connected state from the idle state or the inactive state, the terminal device determines, based on the first bandwidth parameter, that the bandwidth of the initial BWP is the first bandwidth. For example, when the terminal device has a service (answering a call, making a call, or the like) requirement, the terminal device may enter the connected state from the idle state or the inactive state.

A random access process is a process in which the terminal device enters the connected state from the idle state or the inactive state, and specifically includes the following steps.

Step 1: The terminal device sends a random access request to the network device. For example, the random access request may also be referred to as an Msg1, and may specifically be a preamble.

Step 2: After receiving the random access request, the network device sends a random access response to the terminal device. The random access response may also be referred to as an Msg2. It should be noted that the random access response is carried on a PDSCH, and the terminal device needs to detect a PDCCH on a downlink frequency domain resource used to carry the random access response; and then determines a position of the corresponding PDSCH on the downlink frequency domain resource used to carry the random access response, and receives the random access response at the position of the corresponding PDSCH on the downlink frequency domain resource used to carry the random access response. When the downlink frequency domain resource used to carry the random access response is not configured in the system information, the initial BWP of the second bandwidth is used as the downlink frequency domain resource used to carry the random access response. In addition, it should be further noted that the downlink frequency domain resource used to carry the random access response may also be referred to as a random access response control resource set (RAR CORESET).

Step 3: After receiving the random access response sent by the network device, the terminal device sends a connection setup request to the network device. The connection setup request may also be referred to as an Msg3.

Step 4: After receiving the connection setup request, the network device sends a connection configuration message to the terminal device. The connection configuration message may also be referred to as an Msg4.

Step 5: After receiving the connection configuration message, the terminal device performs corresponding configuration based on the connection configuration message. In this case, the terminal device enters the connected state. Then, the UE sends a random access complete message to the network device. The random access complete message may also be referred to as an Msg5. For example, when the terminal device enters the connected state from the idle state, the random access complete message may also be referred to as a connection setup complete message. For another example, when the terminal device enters the connected state from the inactive state, the random access complete message may also be referred to as an RRC resume complete message.

In some embodiments, a moment at which the bandwidth of the initial BWP of the terminal device is adjusted may be pre-agreed on.

For example, if the moment that is pre-agreed on and at which the bandwidth of the initial BWP of the terminal device is adjusted is a moment at which the terminal device sends the random access request to the network device, when the terminal device sends the random access request to the network device, the terminal device determines, based on the first bandwidth parameter, that the bandwidth of the initial BWP is the first bandwidth. Then, the terminal device adjusts the radio frequency of the transceiver from the second bandwidth to the first bandwidth. After the terminal device adjusts the radio frequency of the transceiver from the second bandwidth to the first bandwidth, the terminal device works on an initial BWP of the first bandwidth. For example, the terminal device receives the random access response on the initial BWP of the first bandwidth.

It should be noted that when the terminal device sends the random access request to the network device, the terminal device determines, based on the first bandwidth parameter, that the bandwidth of the initial BWP is the first bandwidth. The terminal device may send the random access request to the network device at any moment before the terminal device listens to the random access response (RAR) and after the terminal device determines that the terminal device needs to send the random access request to the network device. A start moment of listening to the RAR by the terminal device is a start moment of a RAR window, and an end moment of listening to the RAR by the terminal device is an end moment of the RAR window. To be specific, a purpose of adjusting the bandwidth of the initial BWP by the terminal device is to avoid a case in which the terminal device misses listening to the RAR on the initial BWP of the second bandwidth. To achieve the purpose of adjusting the bandwidth of the initial BWP, it needs to be ensured as much as possible that, after determining that the terminal device needs to send the random access request to the network device, the terminal device completes adjustment of the bandwidth of the initial BWP before the start moment of the RAR window.

For example, the terminal device determines, based on the first bandwidth parameter at a sending moment T1 of the random access request, that the bandwidth of the initial BWP is the first bandwidth. After determining that the bandwidth of the initial BWP is the first bandwidth, the terminal device adjusts the bandwidth of the initial BWP from the second bandwidth to the first bandwidth at, for example, a moment T2 before the start moment of the RAR window. The sending moment T1 of the random access request is before the moment T2. T2 may be any moment between T1 and the start moment of the RAR window.

For another example, at a moment T3 after the terminal device sends the random access request to the network device, the terminal device determines, based on the first bandwidth parameter, that the bandwidth of the initial BWP is the first bandwidth. After determining that the bandwidth of the initial BWP is the first bandwidth, the terminal device adjusts the bandwidth of the initial BWP from the second bandwidth to the first bandwidth at, for example, a moment T4 before the start moment of the RAR window. T3 is before the moment T4. T4 may be any moment between T3 and the start moment of the RAR window.

For still another example, after the terminal device determines that the terminal device needs to send the random access request to the network device, at a moment T5 before the sending moment of the random access request, the terminal device determines, based on the first bandwidth parameter, that the bandwidth of the initial BWP is the first bandwidth. After determining that the bandwidth of the initial BWP is the first bandwidth, the terminal device adjusts the bandwidth of the initial BWP from the second bandwidth to the first bandwidth at, for example, a moment T6 before the start moment of the RAR window. T5 is before the moment T6. T6 may be any moment between T5 and the start moment of the RAR window. For example, the moment T6 may be the sending moment of the random access request.

It should be further noted that, for understanding of sending the random access request by the terminal device to the network device in the embodiments of this application, refer to the foregoing related descriptions. Repeated parts are not described in detail again.

For another example, if the moment that is pre-agreed on and at which the bandwidth of the initial BWP of the terminal device is adjusted is a moment at which the terminal device sends the random access complete message to the network device, when the terminal device sends the random access complete message to the network device, the terminal device determines, based on the first bandwidth parameter, that the bandwidth of the initial BWP is the first bandwidth.

It should be noted that when sending the random access complete message to the network device, the terminal device determines, based on the first bandwidth parameter, that the bandwidth of the initial BWP is the first bandwidth. The terminal device may send the random access complete message to the network device at a moment after the terminal device determines that the terminal device needs to send the random access complete message to the network device. That is, the terminal device may complete adjustment of the bandwidth of the initial BWP after determining that the terminal device needs to send the random access complete message to the network device. In addition, it should be further noted that after receiving the random access complete message sent by the terminal device, the network device may send downlink data to the terminal device, and the terminal device adjusts the bandwidth of the initial BWP to better receive the downlink data sent by the network device. Therefore, to adjust the bandwidth of the initial BWP, it is ensured as much as possible that the terminal device completes adjustment of the bandwidth of the initial BWP at the sending moment of the random access complete message or at a moment before the sending moment of the random access complete message. The downlink data sent by the network device in response to the random access complete message may be downlink service data, downlink control data, or the like. This is not limited.

For example, at a moment t1 at which the terminal device determines that the terminal device needs to send the random access complete message to the network device, the terminal device determines, based on the first bandwidth parameter, that the bandwidth of the initial BWP is the first bandwidth. After determining that the bandwidth of the initial BWP is, for example, the first bandwidth, the terminal device adjusts the bandwidth of the initial BWP from the second bandwidth to the first bandwidth at, for example, a moment t2 before the sending moment of the random access complete message. t1 is before the moment t2. t2 may be any moment between t1 and the sending moment of the random access complete message.

For example, the terminal device determines, based on the first bandwidth parameter at the sending moment t1 of the random access complete message, that the bandwidth of the initial BWP is the first bandwidth. After determining that the bandwidth of the initial BWP is the first bandwidth, the terminal device adjusts the bandwidth of the initial BWP from the second bandwidth to the first bandwidth. Therefore, the terminal device can listen to, on an initial BWP of the first bandwidth, the downlink data sent by the network device.

It should be further noted that, for understanding of sending the random access complete message by the terminal device to the network device in the embodiments of this application, refer to the foregoing related descriptions. Repeated parts are not described in detail again.

In addition, in this embodiment of this application, the moment at which the bandwidth of the initial BWP of the terminal device is adjusted may be pre-agreed on as another moment, for example, a moment at which the terminal device sends the connection setup request to the network device. This is not limited.

In some other embodiments, the system information further includes configuration information of the downlink frequency domain resource used to carry the random access response. For example, the system information includes a second bandwidth parameter, and the second bandwidth parameter indicates a bandwidth of the downlink frequency domain resource used to carry the random access response. The terminal device determines, based on the bandwidth indicated by the second bandwidth parameter and the second bandwidth, a moment at which the bandwidth of the initial BWP of the terminal device is adjusted.

For example, when the bandwidth indicated by the second bandwidth parameter is greater than the second bandwidth, when sending the random access request to the network device, the terminal device determines, based on the first bandwidth parameter, that the bandwidth of the initial BWP is the first bandwidth.

Figure 5:
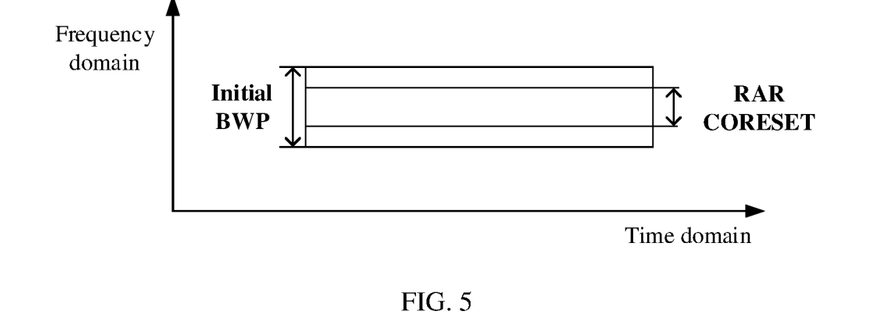
FIG. 5 is a schematic diagram of bandwidths of an initial BWP and a RAR CORESET according to an embodiment of this application.

For another example, when the bandwidth indicated by the second bandwidth parameter is less than or equal to the second bandwidth, when sending the random access complete message to the network device, the terminal device determines, based on the first bandwidth parameter, that the bandwidth of the initial BWP is the first bandwidth. For example, FIG. 5 is a schematic diagram of an initial BWP and a frequency domain resource used to carry a random access response that exist when the bandwidth indicated by the second bandwidth parameter is less than the second bandwidth.

In addition, in some other embodiments, the system information may further include second indication information, and the second indication information is used to indicate a first moment. The terminal device determines, based on the first bandwidth parameter, that starting from the first moment, the bandwidth of the initial BWP is the first bandwidth.

It should be noted that the first moment is the moment at which the bandwidth of the initial BWP used for the terminal device is adjusted. It should be noted that the moment at which the bandwidth of the initial BWP used for the terminal device is adjusted may also be expressed as a moment at which the bandwidth of the initial BWP used for the terminal device is switched. For example, the first moment may be a moment in the random access process. For example, the first moment is the moment at which the terminal device sends the random access request to the network device, or the first moment is the moment at which the terminal device sends the random access complete message to the network device. Alternatively, the first moment may be another preset moment, for example, a moment at which the terminal device sends uplink data to the network device for the first time after entering the connected state. The first moment is not limited in the embodiments of this application.

Example 1: When the first moment is the moment at which the terminal device sends the random access request to the network device, the terminal device determines, based on the first bandwidth parameter, that starting from the moment at which the terminal device sends the random access request to the network device, the bandwidth of the initial BWP is the first bandwidth. When the bandwidth of the initial BWP of the terminal device in the idle state or the inactive state is the second bandwidth, the terminal device adjusts the radio frequency of the transceiver from the second bandwidth to the first bandwidth. When the bandwidth of the initial BWP of the terminal device in the idle state or the inactive state is the first bandwidth, the terminal device does not adjust the radio frequency of the transceiver.

Example 2: When the first moment is the moment at which the terminal device sends the random access complete message to the network device, the terminal device determines, based on the first bandwidth parameter, that starting from the moment at which the terminal device sends the random access complete message to the network device, the bandwidth of the initial BWP is the first bandwidth. Whether the terminal device adjusts the radio frequency of the transceiver is related to the bandwidth of the initial BWP when the terminal device is in the idle state or the inactive state. For a specific implementation, refer to Example 1. Details are not described herein again.

The foregoing specifically describes a manner in which the terminal device adjusts the bandwidth of the initial BWP when the first indication information indicates that the bandwidth of the initial BWP used for the terminal device is the second bandwidth, and the terminal device enters the connected state from the idle state or the inactive state. However, after the terminal device enters the connected state, when a network environment is relatively poor, a service ends, and so on, the terminal device may further enter the idle state or the inactive state from the connected state, to reduce the power consumption of the terminal device.

In the embodiments of this application, to further reduce the power consumption of the terminal device, the bandwidth of the initial BWP may be further re-determined when the terminal device enters the idle state or the inactive state from the connected state.

In some embodiments, if the terminal device enters the idle state or the inactive state from the connected state, the terminal device determines the bandwidth of the initial BWP based on the first indication information. For example, the first indication information indicates that the bandwidth of the initial BWP used for the terminal device is the second bandwidth. If the terminal device enters the idle state or the inactive state from the connected state, the terminal device determines, based on the first indication information, that the bandwidth of the initial BWP is the second bandwidth. Then, the terminal device correspondingly adjusts the radio frequency of the transceiver to the second bandwidth. For another example, the first indication information indicates that the bandwidth of the initial BWP used for the terminal device is the first bandwidth. If the terminal device enters the idle state or the inactive state from the connected state, the terminal device determines, based on the first indication information, that the bandwidth of the initial BWP is the first bandwidth. In this case, the terminal device does not need to correspondingly adjust the radio frequency of the transceiver.

In some other embodiments, the network device may send a connection release message to the terminal device when the terminal device enters the idle state or the inactive state from the connected state because the terminal device releases a corresponding connection. The connection release message includes fourth indication information, and the fourth indication information indicates that the bandwidth of the initial BWP used for the terminal device is a third bandwidth. The connection release message may be radio resource control (RRC) signaling, or may be signaling of another type. This is not limited.

It should be noted that the third bandwidth may be the first bandwidth, or may be the second bandwidth, or may be a bandwidth other than the first bandwidth and the second bandwidth. This is not limited in the embodiments of this application. During specific implementation, the third bandwidth may be determined by the network device based on a preconfigured policy, or may be a bandwidth preconfigured in the network device. This is not limited in the embodiments of this application either.

For example, when the first bandwidth is greater than the second bandwidth, to reduce the power consumption of the terminal device, the third bandwidth may be the second bandwidth, or may be another bandwidth less than the first bandwidth. However, to prevent the terminal device from missing a paging when listening to pagings on an initial BWP of the third bandwidth, when the third bandwidth is the another bandwidth less than the first bandwidth, the third bandwidth is greater than or equal to the second bandwidth.

For example, when the third bandwidth may be the second bandwidth, the terminal device receives the connection release message sent by the network device, and determines, based on the fourth indication information, that the bandwidth of the initial BWP is the second bandwidth. In addition, it should be noted that, after receiving the connection release message sent by the network device, the terminal device enters the idle state or the inactive state from the connected state. When the terminal device is in the connected state, the bandwidth of the initial BWP is the first bandwidth. Therefore, when the terminal device enters the idle state or the inactive state, the terminal device needs to readjust the radio frequency of the transceiver based on the bandwidth that is of the initial BWP and that is determined based on the fourth indication information. Specifically, the terminal device adjusts the radio frequency of the transceiver from the first bandwidth to the second bandwidth.

For another example, when the third bandwidth is the first bandwidth, the terminal device receives the connection release message sent by the network device, and determines, based on the fourth indication information, that the bandwidth of the initial BWP is the first bandwidth. In addition, when the terminal device is in the connected state, the bandwidth of the initial BWP is the first bandwidth. Therefore, when the terminal device enters the idle state or the inactive state, and the bandwidth that is of the initial BWP and that is determined based on the fourth indication information is the first bandwidth, there is no need to readjust the radio frequency of the transceiver.

For still another example, when the third bandwidth may be the bandwidth other than the first bandwidth and the second bandwidth, the terminal device receives the connection release message sent by the network device, and determines, based on the fourth indication information, that the bandwidth of the initial BWP is the third bandwidth. In addition, it should be noted that, after receiving the connection release message sent by the network device, the terminal device enters the idle state or the inactive state from the connected state. When the terminal device is in the connected state, the bandwidth of the initial BWP is the first bandwidth. Therefore, when the terminal device enters the idle state or the inactive state, the terminal device needs to readjust the radio frequency of the transceiver based on the bandwidth that is of the initial BWP and that is determined based on the fourth indication information. Specifically, the terminal device adjusts the radio frequency of the transceiver from the first bandwidth to the third bandwidth. In addition, it should be noted that, in the embodiments of this application, that the terminal device adjusts the radio frequency of the transceiver from the first bandwidth to the third bandwidth may also be expressed as that the terminal device performs switching on the radio frequency of the transceiver from the first bandwidth to the third bandwidth.

The foregoing embodiments in this application may be used in combination, or may be used separately.

In the foregoing embodiments provided in this application, the communication method provided in the embodiments of this application is described from a perspective of the terminal device and the network device as execution bodies. To implement the functions in the communication methods provided in the embodiments of this application, the terminal device and the network device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 6:
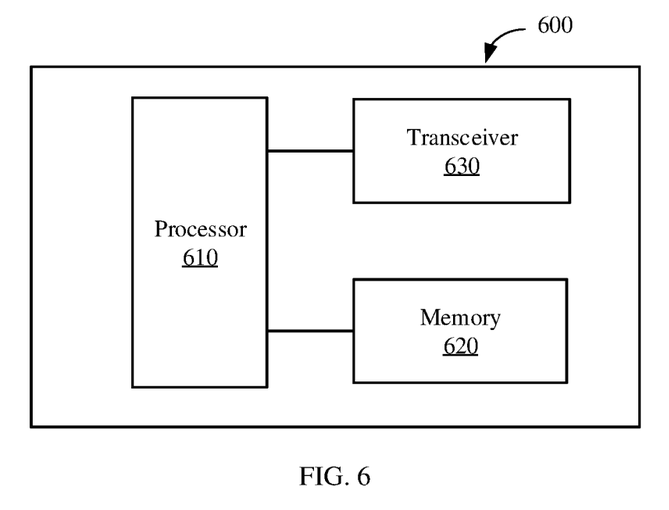
FIG. 6 is a schematic structural diagram of a device according to an embodiment of this application.

Based on a same concept, FIG. 6 shows an apparatus 600 according to this application. For example, the apparatus 600 includes at least one processor 610, a memory 620, and a transceiver 630. The processor 610 is coupled to the memory 620 and the transceiver 630. Coupling in this embodiment of this application is indirect coupling or communication connection between apparatuses, units, or modules, may be in an electrical form, a mechanical form, or another form, and is used for information exchange between the apparatuses, the units, or the modules.

The transceiver 630 is configured to receive or send data. The transceiver 630 may include a receiver and a transmitter. The receiver is configured to receive data, and the transmitter is configured to send data. The memory 620 is configured to store a program instruction. The processor 610 is configured to invoke the program instruction stored in the memory 620, to perform the communication method shown in FIG. 4 in the embodiments of this application.

The processor 610 may be a general-purpose central processing unit (CPU), a microprocessor, an application-specific integrated circuit (ASIC), or one or more integrated circuits, and is configured to perform a related operation, to implement the technical solutions provided in the embodiments of this application.

It should be noted that when the apparatus 600 is a terminal device, the processor 610 invokes the program instruction stored in the memory 620, to implement the steps performed by the terminal device in the communication method shown in FIG. 4 in the embodiments of this application. When the apparatus 600 is a network device, the processor 610 invokes the program instruction stored in the memory 620, to implement the steps performed by the network device in the communication method shown in FIG. 4 in the embodiments of this application.

It should be noted that although only the processor 610, the transceiver 630, and the memory 620 are shown in the apparatus 600 shown in FIG. 6, in a specific implementation process, a person skilled in the art should understand that the apparatus 600 further includes another component required for implementing normal running. In addition, depending on a specific requirement, a person skilled in the art should understand that the apparatus 600 may further include a hardware component for implementing another additional function. In addition, a person skilled in the art should understand that the apparatus 600 may include only devices or modules necessary for implementing this embodiment of this application, and does not need to include all the devices shown in FIG. 6.

Figure 7:
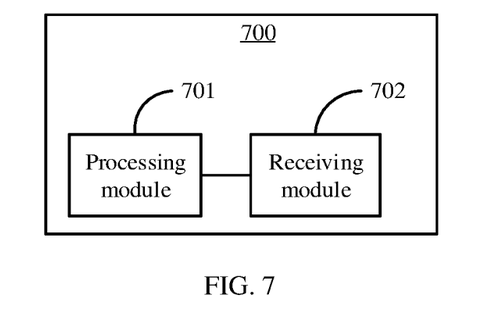
FIG. 7 is a schematic structural diagram of another device according to an embodiment of this application.

Based on a same concept, FIG. 7 shows an apparatus 700 according to an embodiment of this application. The apparatus 700 includes a processing module 701 and a transceiver module 702. The transceiver module 702 is configured to receive or send data, and may be implemented by using a transceiver. Specifically, the transceiver module 702 is a module having receiving and sending functions, and may include a receiving module and a sending module. The receiving module is configured to receive data, and the sending module is configured to send data. If the apparatus 700 is a terminal device, the processing module 701 is configured to perform the steps performed by the terminal device in the communication method shown in FIG. 4. If the apparatus 700 is a network device, the processing module 701 is configured to perform the steps performed by the network device in the communication method shown in FIG. 4.

Figure 8:
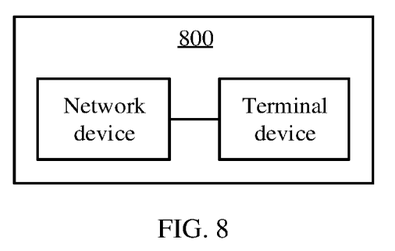
FIG. 8 is a schematic structural diagram of a communications system according to an embodiment of this application.

As shown in FIG. 8, an embodiment of this application further provides a communications system 800, including the terminal device in the embodiments of this application and the network device in the embodiments of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein.

A person of ordinary skill in the art may clearly know that the embodiments of this application may be implemented through hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communications medium, and the communications medium includes any medium that enables a computer program to be transmitted from one place to another. The storage medium may be any available medium accessible by a computer. The computer-readable medium may include, by way of example and not limitation, a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared, radio, and microwave, the coaxial cable, the optical fiber/cable, the twisted pair, the DSL, or the wireless technologies such as infrared, radio, and microwave are included in a definition of a medium to which the coaxial cable, the optical fiber/cable, the twisted pair, the DSL, or the wireless technologies such as the infrared ray, the radio, and the microwave belong. A disk and a disc that are used in the embodiments of this application include a compact disc (CD), a laser disc, an optical disc, a digital video disc (DVD), a floppy disk, and a Blu-ray disc. The disk usually magnetically copies data, and the disc optically copies data in a laser manner. The foregoing combination shall also be included in the protection scope of the computer-readable medium.

It is clear that a person skilled in the art can make various modifications and variations to this application without departing from the spirit and scope of this application. In this way, if these modifications and variations of this application fall within the scope of the claims of this application and their equivalent technologies, this application is also intended to cover these modifications and variations.

What is claimed is:

1. A method, applied in a terminal device, the method comprising:
receiving a master information block (MIB) from a network device, wherein the MIB indicates a bandwidth of a control resource set 0 (CORESET 0), wherein the CORESET 0 is used to schedule a system information block (SIB) 1;
when the terminal device is in a radio resource control (RRC) idle state or an RRC inactive state, determining, based on the MIB, that a bandwidth of an initial bandwidth part (BWP) is a second bandwidth, wherein the second bandwidth is the bandwidth of the CORESET 0; receiving a connection configuration message Msg4;
entering an RRC connected state in response to receiving the connection configuration message Msg4; and
when the terminal device enters the RRC connected state from the RRC idle state or the RRC inactive state, adjusting, based on the SIB 1, the bandwidth of the initial BWP from the second bandwidth to a first bandwidth after determining that a connection setup complete message or an RRC resume complete message needs to be sent to the network device, wherein the first bandwidth is indicated by the SIB 1, and wherein the first bandwidth is greater than the second bandwidth.

2. The method according to claim 1, wherein
the SIB 1 comprises a first bandwidth parameter; and
adjusting, based on the SIB 1, the bandwidth of the initial BWP from the second bandwidth to the first bandwidth comprises:
  adjusting, based on the first bandwidth parameter, the bandwidth of the initial BWP from the second bandwidth to the first bandwidth.

3. The method according to claim 1, further comprising:
when the terminal device enters the RRC idle state or the RRC inactive state from the RRC connected state, adjusting, based on a connection release message, the bandwidth of the initial BWP from the second bandwidth to a third bandwidth, wherein the third bandwidth is indicated by the connection release message.

4. An apparatus, comprising:
a receiver, configured to receive a master information block (MIB) from a network device, wherein the MIB indicates a bandwidth of a control resource set 0 (CORESET 0), and wherein the CORESET 0 is used to schedule a system information block (SIB) 1; and
at least one processor, configured to:
  when a terminal device is in a radio resource control (RRC) idle state or an RRC inactive state, determine that a bandwidth of an initial bandwidth part (BWP) of the terminal device is a second bandwidth, wherein the second bandwidth is the bandwidth of the CORESET 0; and
  when the terminal device enters an RRC connected state from the RRC idle state or the RRC inactive state, adjust, based on the SIB 1, the bandwidth of the initial BWP from the second bandwidth to a first bandwidth after determining that a connection setup complete message or an RRC resume complete message needs to be sent to the network device, wherein the first bandwidth is indicated by the SIB 1, and wherein the first bandwidth is greater than the second bandwidth;
wherein:
  the receiver is further configured to receive a connection configuration message Msg4; and
  the at least one processor is further configured to cause the apparatus to enter the RRC connected state in response to receiving the connection configuration message Msg4.

5. The apparatus according to claim 4, wherein the SIB 1 comprises a first bandwidth parameter, and the at least one processor is configured to adjust, based on the first bandwidth parameter, the bandwidth of the initial BWP from the second bandwidth to the first bandwidth.

6. The apparatus according to claim 4, wherein the at least one processor is further configured to:
  when the terminal device enters the RRC idle state or the RRC inactive state from the RRC connected state, adjusting, based on a connection release message, the bandwidth of the initial BWP from the second bandwidth to a third bandwidth, wherein the third bandwidth is indicated by the connection release message.

7. A non-transitory computer-readable medium having program instructions stored thereon, wherein, when the instructions are executed by at least one processor in a terminal device, the instructions cause the terminal device to:
  receive a master information block (MIB) from a network device, wherein the MIB indicates a bandwidth of a control resource set 0 (CORESET 0), and wherein the CORESET 0 is used to schedule a system information block (SIB) 1;
  when the terminal device is in a radio resource control (RRC) idle state or an RRC inactive state, determine, based on the MIB, that a bandwidth of an initial bandwidth part (BWP) is a second bandwidth, wherein the second bandwidth is the bandwidth of the CORESET 0;
  receive a connection configuration message Msg4; and
  enter an RRC connected state in response to receiving the connection configuration message Msg4;
  when the terminal device enters the RRC connected state from the RRC idle state or the RRC inactive state, adjust, based on the SIB 1, the bandwidth of the initial BWP from the second bandwidth to a first bandwidth after determining that a connection setup complete message or an RRC resume complete message needs to be sent to the network device, wherein the first bandwidth is indicated by the SIB 1, and wherein the first bandwidth is greater than the second bandwidth.

8. The non-transitory computer-readable medium according to claim 7, wherein:
the SIB 1 comprises a first bandwidth parameter; and
adjusting, based on the SIB 1, the bandwidth of the initial BWP from the second bandwidth to the first bandwidth comprises:
  adjusting, based on the first bandwidth parameter, the bandwidth of the initial BWP from the second bandwidth to the first bandwidth.

9. The non-transitory computer-readable medium according to claim 7, wherein the instructions further cause the terminal device to:
  when the terminal device enters the RRC idle state or the RRC inactive state from the RRC connected state, adjusting, based on a connection release message, the bandwidth of the initial BWP from the second bandwidth to a third bandwidth, wherein the third bandwidth is indicated by the connection release message.

* * * * *